March 30, 1943.   A. BOYNTON   2,314,867
SEMI-THREADLESS DRILL STEM
Filed Sept. 22, 1938   2 Sheets-Sheet 1

ALEXANDER BOYNTON, INVENTOR,
BY Jesse K. Stone
Lester B. Clark
ATTORNEYS.

March 30, 1943.     A. BOYNTON     2,314,867
SEMI-THREADLESS DRILL STEM
Filed Sept. 22, 1938     2 Sheets-Sheet 2
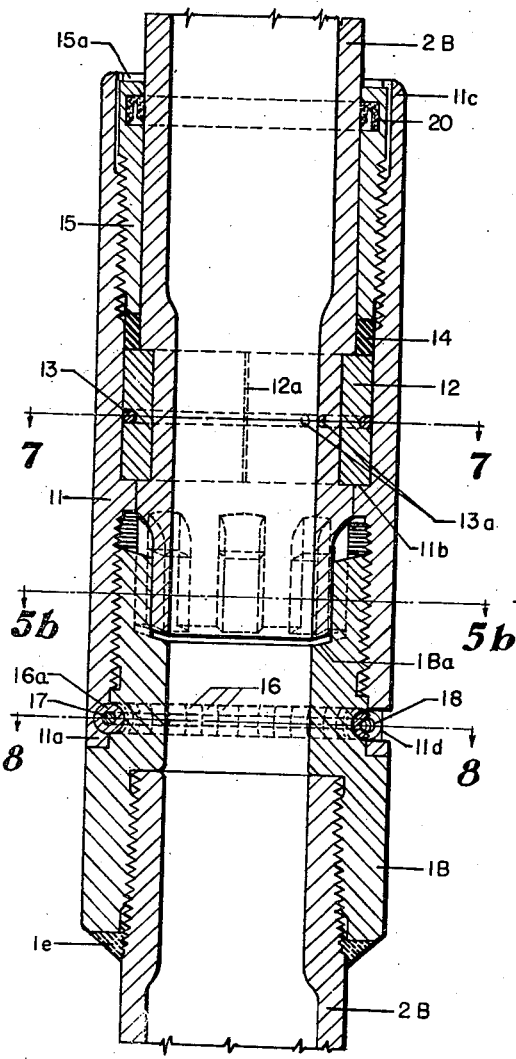
Fig. 6.
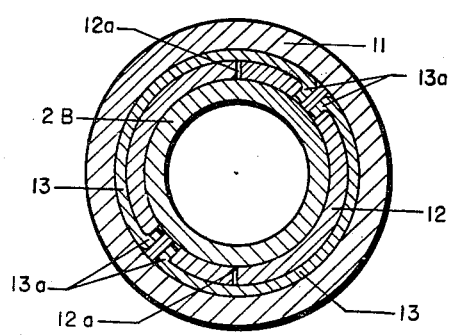
Fig. 7.
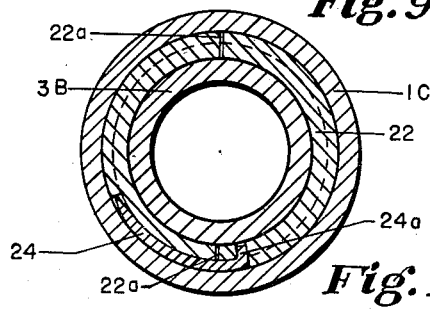
Fig. 8.
Fig. 9.
Fig. 10.
ALEXANDER BOYNTON, INVENTOR,
BY Jesse L. Stone
Lester D. Clark
ATTORNEYS.

Patented Mar. 30, 1943

2,314,867

UNITED STATES PATENT OFFICE 2,314,867

SEMITHREADLESS DRILL STEM

Alexander Boynton, San Antonio, Tex.

Application September 22, 1938, Serial No. 231,206

10 Claims. (Cl. 285—146)

My invention relates primarily to improvement in rotary drill pipe and means for connecting the joints thereof together, as well as a means for connecting all other pipe and shafts together.

The principal objects are: (1) To provide a means for connecting the joints together so that the drill stem can be rotated either clockwise or anti-clockwise without danger of the joints becoming disconnected; (2) to relieve the threads of torque caused by rotation of the drill pipe; (3) to eliminate the compression strain upon the male member and the expansion strain upon the female member while drilling; (4) to provide mechanism to take the rotation torque separate from the mechanism which holds the joints together; (5) to prevent the threads from galling; (6) to prevent leakage between the male and female members of the connection; and, (7) by the employment of small force in making and breaking the connections, to afford greater safety for drilling crews than can be provided by the present threaded means for connecting drill pipe.

A removable metallic ring embedded within the outer wall of the drill pipe is impinged between two connected members in such manner that this ring will support the weight of the pipe. A socket wrench-like contact between the end of the drill pipe and the shell or coupling member permits rotation of the drill pipe in either direction, absorbs all the rotary torque, avoids the compression strain upon the pipe and the expansion strain upon the coupling, and imposes upon the threads the one duty only of holding the pipe together while it is being inserted into or being withdrawn from the well.

I attain the foregoing and other objects by mechanism illustrated in the accompanying drawings in which—

Fig. 6 is a longitudinal section through the second modified form.

Fig. 7 is a cross section on the line 7—7, Fig. 6.

Fig. 8 is a cross section on the line 8—8, Fig. 6.

Fig. 9 is mainly a vertical section of another modified form with part of the drill stem and holding rings in outside view.

Fig. 10 is a cross section on the line 10—10, Fig. 9.

Similar characters of reference are employed to refer to similar parts throughout the several views of each embodiment.

Figure 1:
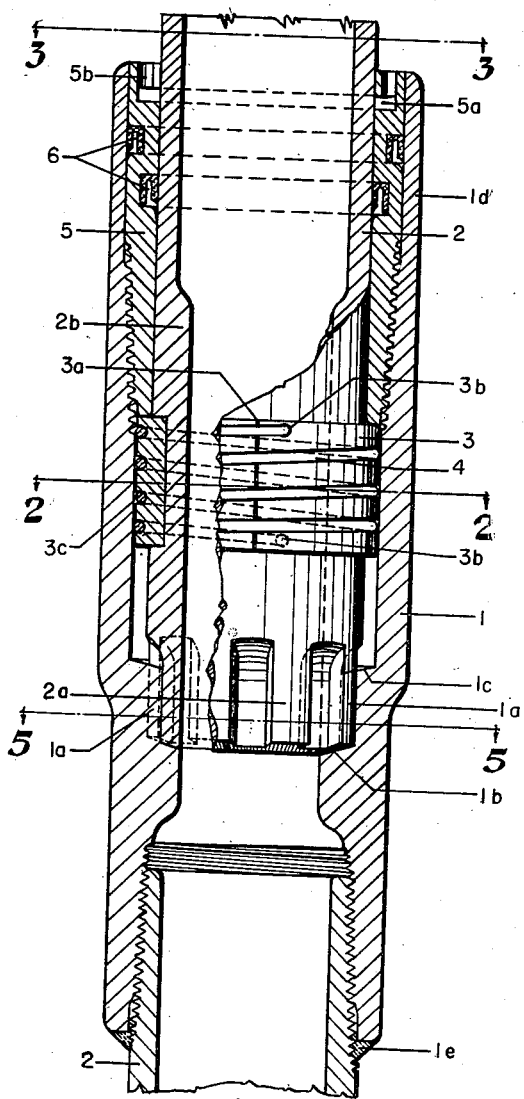
Fig. 1 is mainly a longitudinal section through the preferred embodiment with part of the drill stem and holding ring assemblies in outside view.

In Fig. 1 the lower joint of drill stem 2 is shown threadedly joined to the lower end of coupling-shell member 1, the connection being made more secure by weld 1e. The upper joint of drill pipe 2 is seated upon an internal shelf or shoulder 1b of coupling-shell member 1 and secured against independent rotation therein by lands 2a of the drill pipe engaged between lands 1a of the coupling-shell member, as clearly appears in Fig. 5. The circular sloping surface 1c and the corresponding slope of the bottom end of the drill pipe causes the drill pipe to automatically find the center of the coupling-shell when the drill pipe is inserted into it. When the drill pipe is inserted into the coupling-shell, if the lands 1a and 2a do not enmesh, as appears in Fig. 5, a slight rotation of the drill pipe will cause such engagement. The shoulder 1b has a corresponding slope to that shown at 1c in order that the drill pipe will rest evenly thereon, as appears in Fig. 1.

Figure 2:
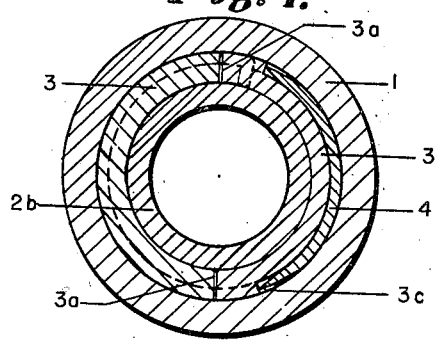
Fig. 2 is a cross section on the line 2—2, Fig. 1.
Figure 3:
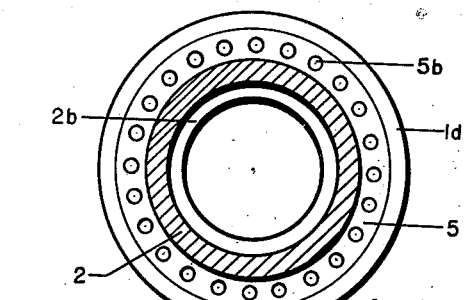
Fig. 3 is a cross section on the line 3—3, Fig. 1.

Within a turned out recess exterior of the drill pipe upon its lower upset end 2b, the ring 3, cut in two halves at 3a, is inserted for approximately one-half of its thickness and secured therein by the coiled wire spring 4. This wire is received flush with the outer surface of ring 3 within spiral slot 3c, as appears in Figs. 1 and 2. The bent ends of the wire are received within holes 3b. The ring 3 is made in two halves in order to permit its assembly within the turned out place upon the drill pipe into which it is snugly fitted. The wire 4 is for the obvious purpose of preventing the ring in two halves from falling out when the drill pipe is removed from the coupling-shell. The drill pipe is secured in place by assembling ring 5 having threaded engagement within coupling-shell 1. The lower end of the assembling ring 5 engages upon the upper end of split ring 3 which, because of its set in engagement within the drill pipe 2, forces the lower end of the drill pipe to engage upon the shoulder 1b, thereby giving firmness and strength to the assembly. The weight of the pipe above each connection rests upon this shoulder 1b when the drill pipe is engaged upon bottom of the well and the weight of the pipe below each connection is carried upon the lower end of assembling ring 5 and the upper end of split ring 3 when the drill pipe is suspended from the top, as appears in Fig. 1.

The U-cups 6, one cup opening downward upon the inner surface of assembling ring 5 and the other opening downward upon the outer surface of the tubular extension 1d, are for the obvious purpose of preventing the escape of pump fluid between ring 5 and drill pipe 2 or tubular extension 1d; the principal purpose of which extension is to house assembling ring 5 in order to prevent this ring from possibly becoming accidentally unscrewed in the well during the drilling operation. The circular recess 5a is provided for additional packing, if needed. The holes 5b are to accommodate a special wrench for assembling or removing the ring 5. The threads between members 1 and 5 are shown to have approximately the same taper as the ordinary tool joint, for the obvious purpose of attaining speed in making or breaking the connection.

Figure 4:
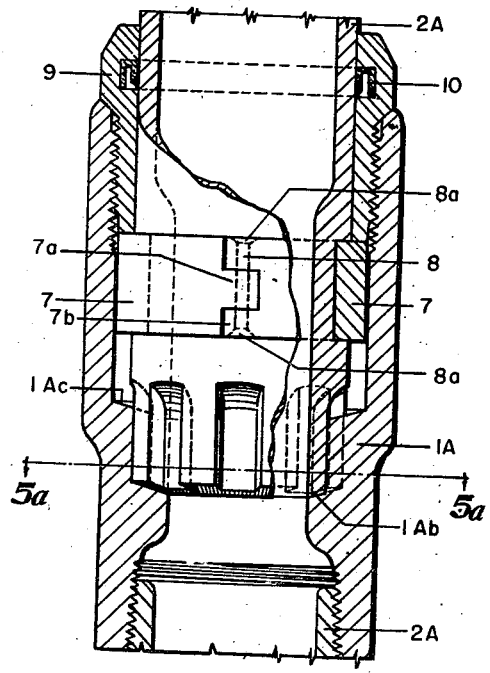
Fig. 4 is mainly a longitudinal section through the first modified form with part of the drill stem and holding ring assembly in outside view.

Fig. 4 illustrates the first modified form of this invention. The lower joint of drill pipe 2A may be secured to the coupling-shell 1A, as shown and stated for Fig. 1. The upper joint of drill pipe has lands engaging with mating lands of the coupling-shell. The section 5a—5a of Fig. 4 corresponds to the section 5—5, Fig. 1. The drill pipe is guided central of the coupling-shell by the sloping surface 1Ac and the lower end of the drill pipe is sloped to rest evenly upon the shoulder 1Ab. The split ring 7 is fitted for part of its thickness into a groove exterior of the drill pipe near the lower upset end thereof, as appears in Fig. 4. This ring has two extensions on one half and four extensions on the other half. The extension 7a fits between the extensions 7b. The two halves are held together by a pin 8 which passes through the extensions and is bradded at either end, as shown at 8a. In this manner the ring 7 is assembled and held from falling off when the drill pipe is removed from the coupling-shell.

The assembling nipple 9, having threaded engagement within the upper end of the member 1A, engages upon the upper end of ring 7 and forces the drill pipe to engage securely upon the shoulder 1Ab, thereby giving rigidity and firmness to the assembly, as appears in Fig. 4.

The U-cup 10, formed to be expanded by fluid pressure from below, is adapted to be expanded and produce a seal-off against the escape of pump fluid between the drill pipe and assembling ring 9, as is apparent in Fig. 4.

Figure 5:
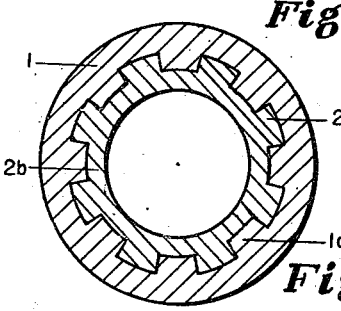
Fig. 5 is a cross section on the line 5—5, Fig. 1.

While the drill stem is being inserted into or being withdrawn from the well, the rings 7 and 9 secure the assembly and, while the drill stem is engaged upon bottom of the well, the weight of the pipe above each connection rests upon the internal sloping surface 1Ab. During rotation of the drill stem the rotary thrust is taken by the engaged lands of the drill stem and coupling-shell, as shown in Fig. 5.

Fig. 6 illustrates the second modified form of this invention. The lower section of drill pipe 2B has threaded connection with the lower end of coupling-shell 1B which connection may be further secured by weld 1e. The upper section of drill pipe 2B engages with the coupling-shell 1B by means of mating lands, as was set out in connection with Figs. 1 and 4. The section 5b—5b, as relates to the engaging lands of members 1B and 2B, is the same as section 5—5, Fig. 1.

The shell 11 has threaded connection over the upper end of member 1B. The depending tubular extension 11a has within it a semi-circular groove opposite and mating with a similar groove upon the outer surface of the member 1B. Within these grooves, forming a circular opening, the jointed rod 16 is slidably fitted. This rod is composed of inner segments 16a and end segments 16b, all segments being strung on the assembling wire 17. Each end of this wire is bradded at 17a within a threaded bore at each end of the end segments. The bevels 16c provide that the assembly of segments will bend to a circle, as shown in Fig. 8, without the ends of the segments impinging upon each other at their greatest diameter. The coiled spring 18 has one end of the securing pins 19 pressed into each end. The other end of these pins fit into the threaded openings in either end of end segment 16b for the purpose of preventing the jointed assembly from working out of its proper position, as shown in Figs. 6 and 8. The threads in the ends of segments 16b are for the purpose of attaching a special tool for inserting or withdrawing the jointed assembly. If the members 1B and 11 should encounter an unscrewing force during the operation of drilling, the assembly 16 will prevent such unscrewing. When properly lubricated the jointed assembly can be readily and quickly applied or removed through the opening 11d of shell 11 (see Fig. 8).

The ring 12 in two halves, the split being indicated at 12a, Fig. 7, is fitted into a recess upon the outer surface of drill pipe 2B, as appears in Fig. 6. The two semi-circular wires 13 fit within a groove upon the outer surface of the ring and have their bent ends 13a (see Fig. 7) received within holes in the halves of ring 12 to hold the two halves of the ring together and in place when the drill pipe is removed from the shell. There may be slight clearance between the end of the drill pipe and the shoulder 1Ba caused by the engagement of ring 12 upon the internal shoulder 11b. The ring 14, which may be of tough rubber or any other yieldable, non-compressible substance, is forced down upon the split ring 12 by assembling ring 15 which has threaded engagement within the shell 11. The purpose of this rubber ring is to prevent pump fluid, which might pass the split ring 12, from escaping between the drill pipe 2B and assembling ring 15 or along the threads between members 11 and 15. Any force tending to pull the connection apart will be resisted by the embedded split ring 12 engaging upon the rubber ring 14 which, in turn, engages under the assembling ring 15, as appears in Fig. 6.

The U-cup 20 fitted within the inner wall of ring 15 is adapted to be expanded and prevent any leakage which might pass the rubber ring 12 and seek to escape between the drill pipe and assembling ring 15. The tubular extension 11c extends upward flush with the top of ring 15 in order to prevent the ring from possibly becoming accidentally unscrewed during the drilling operation. A special wrench may be applied in slots 15a by which the ring may be quickly and easily removed to permit withdrawal of the drill pipe from the members 1B and 11.

Fig. 9 illustrates a further modified form of this invention. The lower joint of drill stem 3B may be threaded into the lower end of coupling-shell 1C and welded thereto, as at 1e, Fig. 6. The upper joint of drill pipe 3B is slidably received within the central portion of the coupling-shell 1C and landed upon the internal shoulder 1Ca, as in Fig. 1, the section 5b'—5b' of Fig. 9 being the same as section 5—5, Fig. 1.

The metallic split ring 22 in two halves, shown cut in two at 22a, is secured about the drill stem by coiled spring wire 24, fitted within a spiral groove and having its opposite bent ends 24a engaged within holes in the split ring 24, as appears in Figs. 9 and 10. The metallic split ring 21, shown cut in two at 21a, is a duplicate of ring 22 and coiled wire 23 is a duplicate of coiled spring wire 24 in construction and purpose. The ring 25, which may be of tough rubber or any other yieldable and non-compressible substance, is fitted about the drill stem between the split rings 21 and 22 to prevent leakage of pump fluid between the drill pipe and coupling-shell 1C. The ring 21 engages upon the shoulders 3Ba and 1Cb. The retaining ring 26, having threaded engagement within the upper end of coupling-shell 1C, normally engages upon the ring 22, thereby firmly securing together the drill pipe 3B and coupling-shell 1C, the pulling apart strain being borne at the engagement between the split ring 22 and assembling ring 9. The annular space 26a provides that the inside diameter of ring 26 is somewhat greater than the outside diameter of the drill pipe below shoulder 3Ba in order that the ring may be assembled, as is apparent.

The assembling rings 5—Fig. 1, 9—Fig. 4, 15—Fig. 6, and 26—Fig. 9, may be securely assembled in their several places, as shown, without the employment of great force, as is necessary in making up ordinary drill stem. Each of said rings likewise can be removed by the application of slight force because the threads are not made up by the drilling thrust. Unscrewing each of said rings, which remain on the drill stem, breaks the joint and screwing each of them in, as shown in each of the several assemblies (Figs. 1, 4, 6, and 9), makes the joint. The makeup and breakout of the drill stem is, therefore, quick, easy, and free from the danger resulting from the use of great force always employed in the makeup and breakout of threaded drill stem connections.

It is apparent that either form of this invention can be employed for pipe unions, shaft couplings, and other similar or related purposes. Where the word "pipe" is employed in the claims herein, it is therefore intended that shafts, rods, staffs and the like are included. Where used as a pipe union, the enmeshing lands between the pipe and coupling-shell and the jointed assembly 16 in Fig. 6 may be omitted. If the construction shown in Figs. 1 or 4 be employed for a pipe union, packing may be added between the members 3 and 5 in Fig. 1 and between the members 7 and 9 in Fig. 4. In such case, the U-cups 6 in Fig. 1 and U-cup 10 in Fig. 4 may also be omitted.

Obviously, many substitutions and minor changes in construction can be made within the scope and purpose of my stated objects and appended claims, and I reserve the right to make such substitutions and changes.

I claim:

1. A pipe connection of the character described comprising a pair of non-rotatable interfitting pipe ends telescoped one within the other, a projection extending from the periphery of the inner pipe end, and a nipple member threaded into the other pipe end to engage said projection to hold said pipe ends against relative longitudinal movement, said projection comprising a split ring and a spring wire to hold said ring in place.

2. A pipe connection of the character described comprising a pair of non-rotatable interfitting pipe ends telescoped one within the other, a projection extending from the periphery of the inner pipe end, and a nipple member threaded into the other pipe end to engage said projection to hold said pipe ends against relative longitudinal movement, said projection comprising a pair of split rings positioned in a groove.

3. A pipe connection of the character described comprising a pair of non-rotatable interfitting pipe ends telescoped one within the other, a projection extending from the periphery of the inner pipe end, and a nipple member threaded into the other pipe end to engage said projection to hold said pipe ends against relative longitudinal movement, said projection comprising a pair of split rings positioned in a groove, and a wire coiled thereabout to hold said rings in place.

4. A pipe connection of the character described comprising a pair of non-rotatable interfitting pipe ends telescoped one within the other, a projection extending from the periphery of the inner pipe end, and a nipple member threaded into the other pipe end to engage said projection to hold said pipe ends against relative longitudinal movement, said projection comprising a pair of split rings positioned in a groove and a seal ring disposed between said split rings.

5. A drill pipe connection including a pipe section, a member threaded and welded thereto, a shell threaded on said member, a locking rod interfitting between said shell and member, a pipe end having lands interfitting in said member so as to transmit torque, a groove about the periphery of said pipe end, a ring projecting radially from said groove, a shoulder in said shell to receive the face of said ring, a sealing member in said shell on top of said ring, and a nipple member threaded into said shell to compress said member and hold said shell and pipe end against longitudinal movement.

6. In a pipe connection, a coupling shell female member having an internal annular landing platform, the inner wall of said member proximately above said platform being constricted and formed into longitudinal lands, a male pipe member having its end formed into longitudinal lands adapted to interfit with said lands of the shell when said members are telescopically engaged with the end of said male member upon said platform, a groove around said male member proximately above said lands, a split ring closely fitting in said groove and extending outward thereof beyond said constriction so as to be slidable within said shell, means for retaining said ring in said groove when said members are not engaged, an assembling ring threadedly engaged within said shell and adapted to engage said ring so as to secure the engagement of said interfitting lands, and means to prevent leakage between said shell and male member.

7. In a pipe connection having a male and a female member adapted to have limited telescopic engagement, a split ring secured within a recess upon the male member, said ring coacting with a second ring secured upon the female member to resist longitudinal movement of each of said members relative to the other, said split ring having peripheral spiral slots and being secured in said recess by a spiral member removably engaged within said peripheral slots.

8. In a pipe connection having a male and a female member adapted to have limited telescopic engagement, a split ring secured within an external recess upon the male member, said ring having a peripheral recess and coacting with a second ring secured upon the female member to resist longitudinal movement of each of said members relative to the other, and a metallic ring engaged in said peripheral recess to secure said split ring in said external recess.

9. In a pipe connection having a male and a female member adapted to have telescopic engagement, two split rings having a compressible member between them, said split rings and compressible member being secured around the male member, and coacting with a second ring secured upon the female member to resist longitudinal movement of each of said members relative to the other, and means for holding said split rings upon said male member.

10. In a pipe connection, a coupling shell female assembly comprising a coupling shell having a second shell secured thereon, an internal landing platform in said coupling shell, the inner wall of said last member proximately above said platform being formed into longitudinal lands; a male pipe member having its end formed into longitudinal lands adapted to interfit with said lands of the coupling shell when said members are telescopically engaged with the end of said male member upon said platform; a groove around said male member proximately above said lands, a split ring closely fitting in said groove and extending outward thereof so as to be slidable within said shell, means for retaining said ring in said groove when said members are not engaged, an assembling ring engaged within said second shell and adapted to engage said split ring so as to secure the engagement of said interfitting lands, and means around said male member to prevent leakage between said member and said assembly.

ALEXANDER BOYNTON.